L. R. FOGG.
GUARD FOR PIPE UNIONS.
APPLICATION FILED MAR. 30, 1910.
968,759.
Patented Aug. 30, 1910.
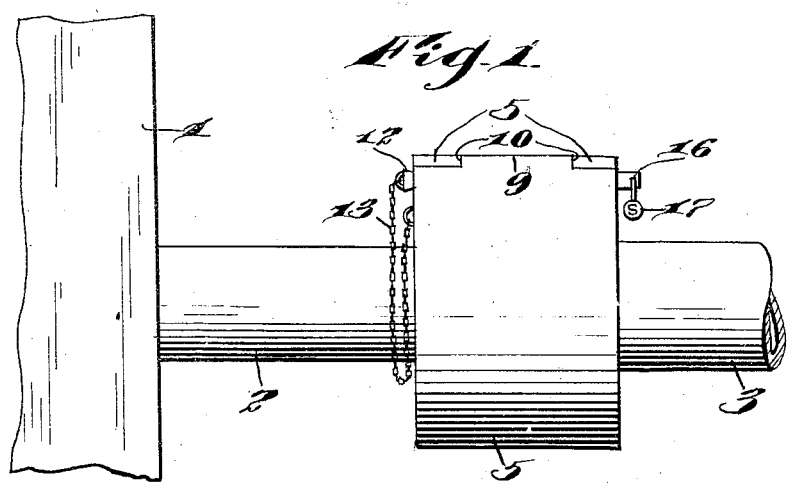
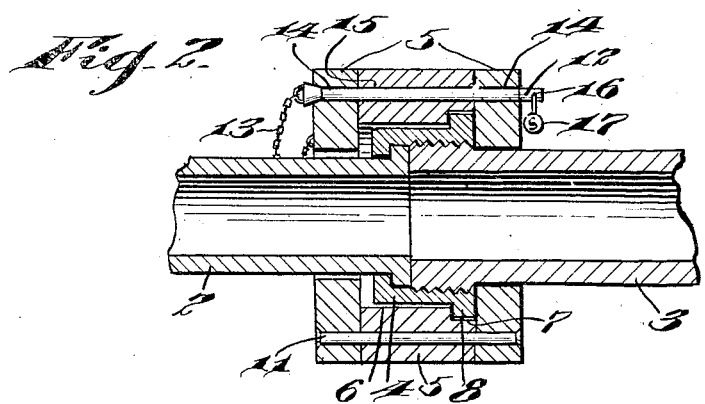
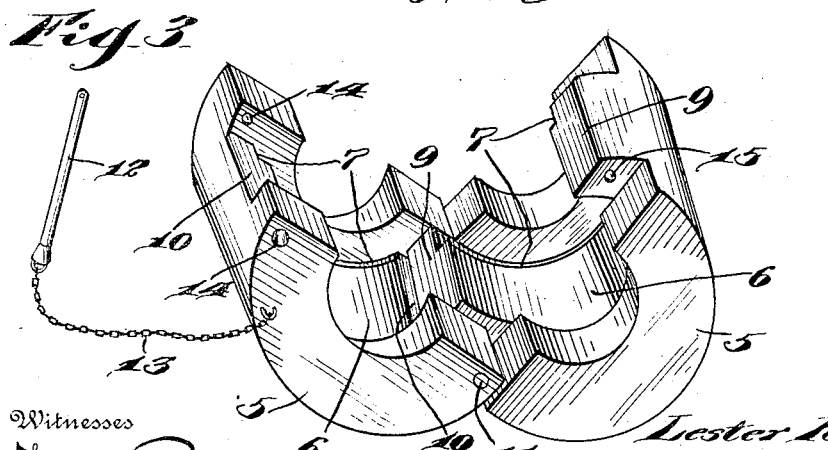
Witnesses
Inventor
Lester R. Fogg,
By Joshua R. H. Potts
Attorney

UNITED STATES PATENT OFFICE.

LESTER R. FOGG, OF DARBY, PENNSYLVANIA.

GUARD FOR PIPE-UNIONS.

968,759.  Specification of Letters Patent. Patented Aug. 30, 1910.

Application filed March 30, 1910. Serial No. 552,448.

*To all whom it may concern:*

Be it known that I, LESTER R. FOGG, a citizen of the United States, residing at Darby, in the county of Delaware and State of Pennsylvania, have invented certain new and useful Improvements in Guards for Pipe-Unions, of which the following is a specification.

My invention relates to improvements in guards for pipe unions, the object of the invention being to provide a guard which will absolutely prevent, without detection, the operation of a pipe union.

While the invention is particularly designed for use in connection with gas meters to prevent persons from short circuiting the meter, it has a wide range of usefulness and I therefore do not limit the guard to any particular use.

With these and other objects in view, the invention consists in certain novel features of construction, and combinations and arrangements of parts as will be more fully hereinafter described and pointed out in the claim.

In the accompanying drawings: Figure 1, is a view in side elevation illustrating my improvements. Fig. 2, is a view in longitudinal section, and Fig. 3, is a perspective view of the guard in open position.

1, represents a meter, 2, a gas pipe connected to the meter, and 3, the house supply pipe, which is joined to pipe 2, by means of a union 4.

5, 5, represent the two members of my improved guard. These members 5, 5, are alike and are of general semi-cylindrical form, having central recesses 6, to accommodate the union 4, and are so shaped as to prevent any longitudinal movement on the pipes as the sections 5, 5, are made with grooves 7, to receive the outwardly flanged end 8, of the union 4. One member 5, is provided at both ends with tongues 9, and the other member at its ends with recesses 10. The tongue and recesses at one end, are permanently connected by a hinge pin 11, and at the other end are connected by a removable pin 12, which latter is secured at one end to one of the members 5, by a flexible chain 13. The pin 12, is adapted to be projected through the registering openings 14, and 15, in the tongued and recessed ends above referred to, and extend through the guard, and at its free end, provided with opening 16, in which a seal 17, is secured. This seal 17, must of course be removed before the pin 12, can be moved, and hence access cannot be had to the union without destroying the seal.

Various slight changes might be made in the general form and arrangement of parts described without departing from my invention and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A device of the character described, comprising two members of general semi-cylindrical form adapted to surround a pipe and inclose a pipe union, both members having semi-cylindrical recesses with curved grooves at one end of each recess to receive the flanged end of a pipe union, a tongue on the end of one member, a recess in the end of the other member receiving said tongue, a pivot pin fixed in one member and projecting through the tongue of the other member, one of said members having a recess at its other end, a tongue on the end of the other member, positioned in said recess, said tongue and said member having registering openings, a removable pin adapted to be positioned in said openings, a flexible connecting device securing one end of the pin to one of said members, and said pin having an opening in its other end for the reception of a seal, substantially as described.

In testimony whereof I have signed my name to this specification in the presence of two subscribing witnesses.

LESTER R. FOGG.

Witnesses:
R. H. KRENKEL,
C. E. POTTS.